Oct. 1, 1940.　　　R. D. NEIDERHISER　　　2,216,320
GEAR SHIFT CONTROL ASSEMBLY
Filed July 20, 1937　　　2 Sheets-Sheet 2
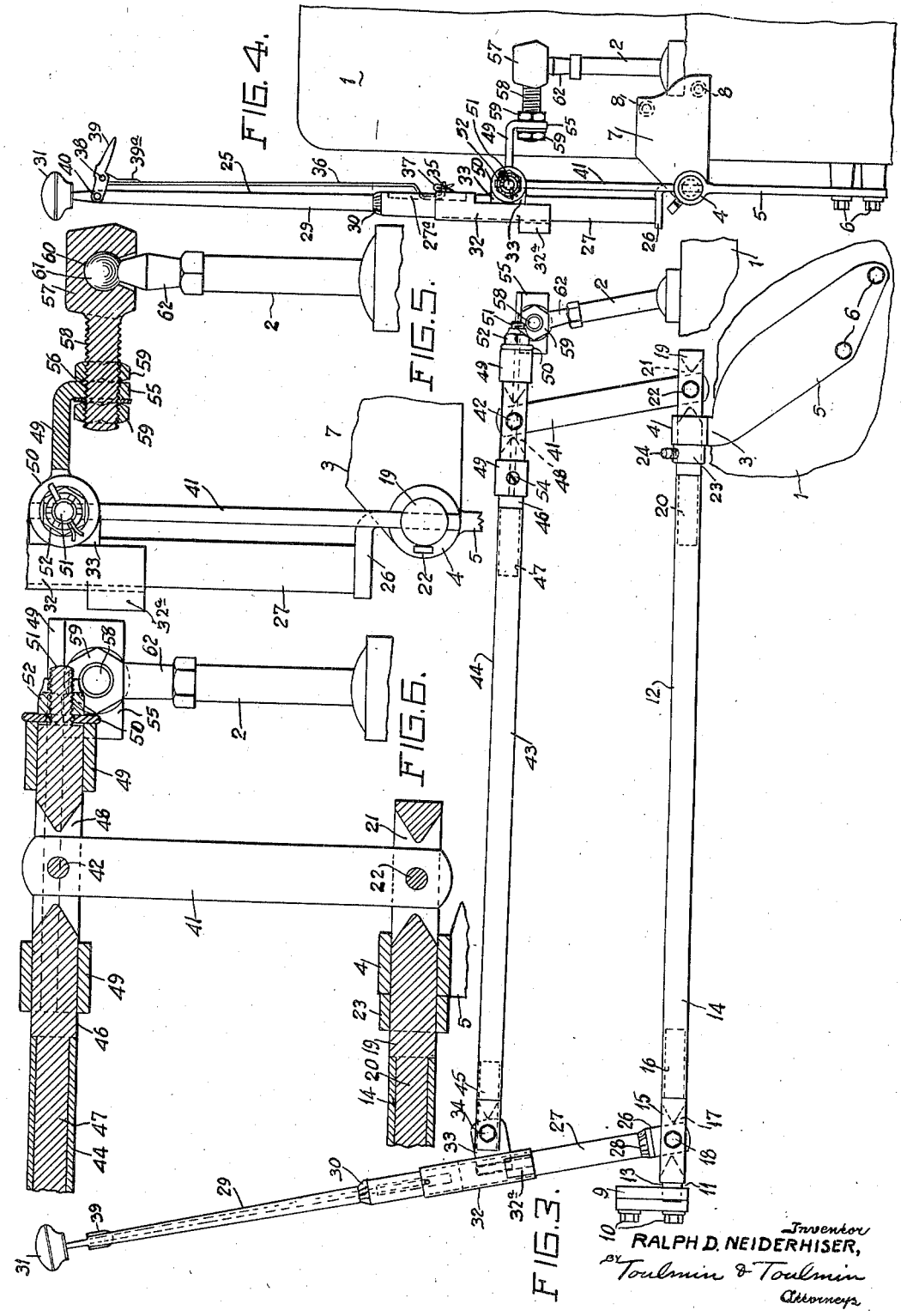
Inventor
RALPH D. NEIDERHISER,
Attorneys Patented Oct. 1, 1940

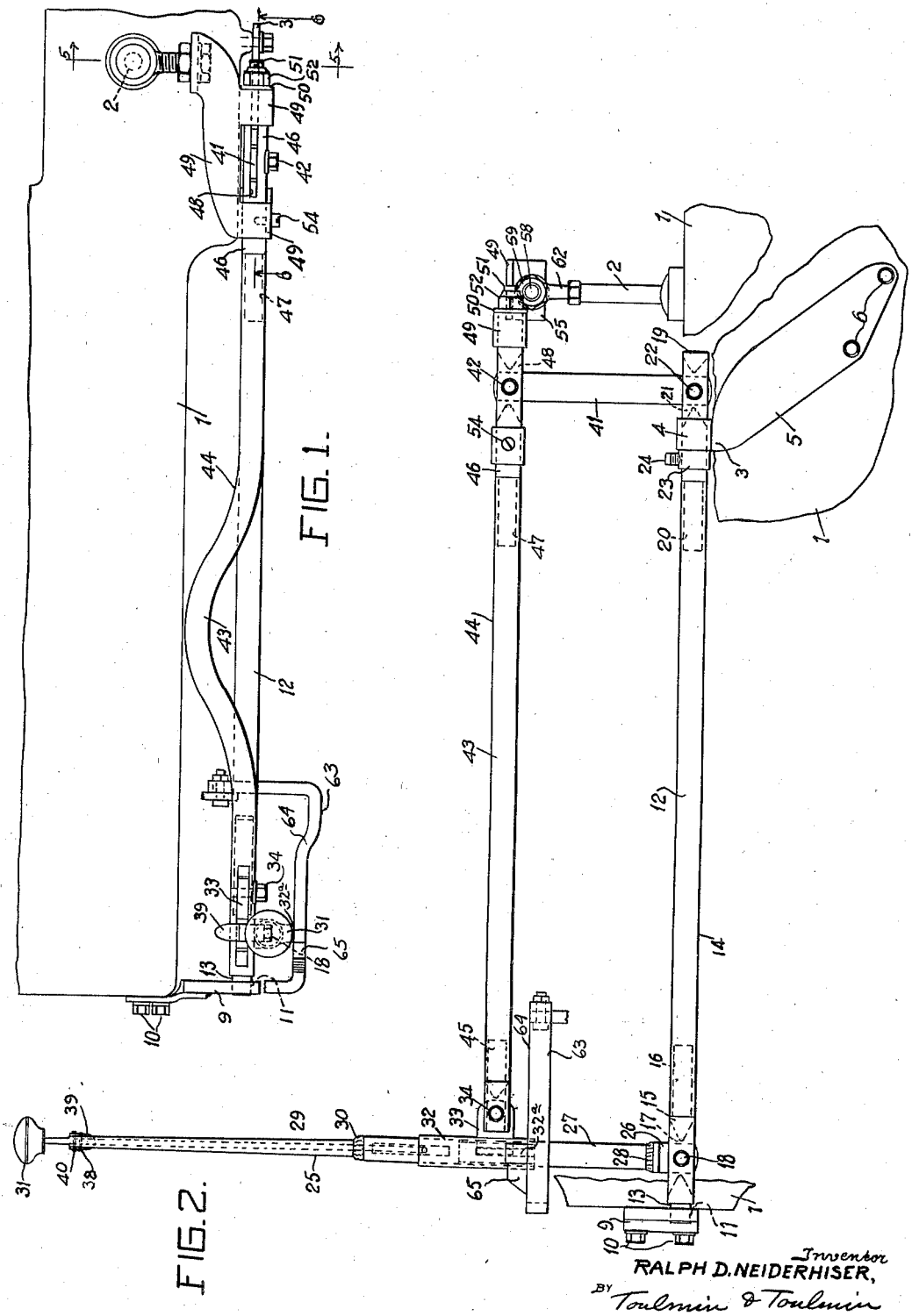

2,216,320

UNITED STATES PATENT OFFICE 2,216,320

GEAR SHIFT CONTROL ASSEMBLY

Ralph D. Neiderhiser, Loudonville, Ohio, assignor to The Flxible Company, Loudonville, Ohio, a corporation of Ohio Application July 20, 1937, Serial No. 154,629

22 Claims. (Cl. 74—476)

This invention relates to remote control means for controlling the conventional gear shift lever of an automotive transmission from a point spaced longitudinally and laterally therefrom.

It is an object of this invention to provide means for controlling the conventional gear shift lever of an automotive transmission from a point substantially spaced therefrom in vehicles having the driver's station so positioned as to preclude or make inconvenient the direct manual engagement of the conventional gear shift lever.

It is a further object of this invention to provide such means which is particularly adapted for use with trucks and/or busses having the driver's station located adjacent or forward of the truck or bus engine and at substantial distance from the conventional gear shift lever of the transmission of the truck or bus.

It is a further object of this invention to provide such means which is particularly adapted for use in rear engine vehicles and in front drive vehicles.

It is a further object of this invention to provide such means which is particularly adapted for use in trucks and/or busses wherein the transmission and the conventional gear shift lever thereof are located at a substantial distance from the driver's seat and/or station.

It is a further object of this invention to provide such control mechanism which is simple, positive in action, strong and foolproof.

It is a further object of this invention to provide, in such mechanism, an auxiliary gear shift lever and a linkage adjustably connecting said auxiliary gear shift lever with a conventional gear shift lever in such manner that the conventional gear shift lever may be shifted and/or controlled manually through operation of the auxiliary gear shift lever.

It is a further object of this invention to provide, in the linkage connecting the auxiliary gear shift lever and the conventional gear shift lever, means for adjusting the relative positions of the auxiliary and conventional gear shift levers.

It is a further object of this invention to provide manually operable means for normally locking or latching the conventional gear shift lever against accidental engagement of the "reverse" gear.

It is a further object of this invention to provide such manually operable locking or latching means which is associated with, and operable from, the auxiliary gear shift lever.

It is a further object of this invention to provide, in such means, a reverse latch releasing mechanism which may be manually actuated by the operator with great ease and facility when it is desired to engage the "reverse" gear.

It is a further object of this invention to provide such mechanism wherein the auxiliary gear shift lever is supported for universal movement and maintained in substantial parallelism with the conventional gear shift lever.

It is a further object of this invention to provide, in such mechanism, a connecting linkage between the auxiliary and conventional gear shift levers, which provides a support for the auxiliary gear shift lever.

It is a further object of this invention to provide, in such mechanism, a linkage which is particularly adapted to be supported upon the engine, with which the transmission including the conventional gear shift lever is associated.

It is a further object of this invention to provide in such mechanism a multiplying leverage which enables the performance of the gear shifting operation with greater ease and less physical effort than is secured with conventional shifting mechanism.

It is a further object of this invention to provide a ball joint connection between the upper end of the conventional gear shift lever and the auxiliary gear shift lever, which ball joint connection includes a threaded adjustable link providing for proper adjustment for the reverse latch by the positioning of the auxiliary gear shift lever with respect to the sector.

It is a further object of this invention to provide means for mounting the auxiliary gear shift on a single unit power plant along with the conventional gear shift in order that the proper adjustment thereof will be undisturbed by vibration or movement of the power plant with respect to chassis and body, especially where the power plant is mounted in rubber.

These and other objects and advantages will appear from the following description taken in connection with the drawings.

In the drawings:

Figure 1 is a top plan view of mechanism constructed according to the principles of this invention, as applied to a conventional automotive engine and transmission;

Figure 2 is a side elevation of the structure shown in Figure 1, with the engine and transmission broken away and showing the conventional gear shift lever in "central" or "neutral" position;

Figure 3 is a view similar to Figure 2, but showing the conventional gear shift lever in an "operative" position;

Figure 4 is a rear elevational view of the structure shown in Figure 1;

Figure 5 is a section on the line 5—5 of Figure 1; and

Figure 6 is a fragmentary view, partly in section, taken on the line 6—6 of Figure 1.

Referring to the drawings in detail, the engine and attached transmission and the parts thereof are generally designated 1, as shown in Figures 1, 2, 3 and 4. The conventional gear shift lever which extends upwardly from the transmission of the vehicle and which is adapted for universal movement with respect thereto is designated 2. 3 generally designates the rear supporting bracket which has a bearing eye 4, from which extends downwardly the substantially vertical web or flange 5 which is rigidly secured by means of bolts 6 to the engine and/or transmission and also extending from the bearing eye 4 is the transverse web or flange 7 which is rigidly secured by means of bolts 8 to the engine and/or transmission, as shown in Figure 4. The bearing eye 4 is thus rigidly positioned with respect to the engine and transmission assembly 1.

At the forward end of the engine is the forward support bracket 9 which is rigidly secured by means of bolts 10 to the forward end of the engine 1. The forward support bracket 9 extends transversely of the engine and, at its outer end, is provided with a bearing aperture 11 which is adapted to pivotally support a reduced end portion 13 of the pivot rod which is generally designated 12. The pivot rod which is generally designated 12 comprises a hollow central tubular member 14 having the forward rod end 15 rigidly secured thereto by means of a reduced portion 16 of the rod end 15 which extends into the open end of the tubular member 14 and which is fixed thereto by means of welding, riveting or the like. The rod end 15 has the reduced portion 13 formed integrally thereon and between this portion and the reduced portion 16 is provided with a transverse slot 17 which extends from side to side therethrough and which diverges outwardly in both directions.

Centrally of the slot 17 is the cross bore which is provided in the rod end 15 for receiving the cross bolt 18 which provides a pivotal bearing for the auxiliary gear shift lever, as will hereinafter more clearly appear. At its opposite end, the tubular member 14 is provided with the rear rod end 19 having a reduced end portion 20 similar to the reduced end portion 16 of the rod end 15 and secured in similar manner to the end portion of the tubular member 14, into which it extends in similar manner. The rod end 19 is provided with a transverse slot 21 similar to the transverse slot 17 in the rod end 15 and disposed in parallelism therewith, and the rod end 19 is likewise provided with a cross bore adapted to receive the cross bolt 22 which is similar to the cross bolt 18 and disposed in parallelism therewith.

Rigidly secured, by means of set screw 24, to the rod end 19 just forwardly of the bearing eye 4 is the bearing collar 23 which is adapted to cooperate with the rigidly supported bearing eye 4 to prevent excessive axial movement of the bearing rod 12 and displacement of the reduced end portion 13 thereof from the aperture 11. The bearing rod 12 is, therefore, supported by the brackets 3 and 9 for free pivotal movement about a longitudinal axis, and excessive endwise or axial movement thereof is prevented by cooperation of the bearing collar 23 with the bearing eye 4 of the rear bracket member 3.

The auxiliary gear shift lever which is generally designated 25 comprises an angle member 26 of L-section which is pivotally supported on the cross bolt 18 in the slot 17 of the rod end 15, to which is rigidly secured, as by means of welding 28, the shaft portion 27, to the upper end of which is rigidly secured, as by means of welding 30, the extension 29 having the handle or ball member 31 secured to its upper end. Slidable on the lower or shaft portion 27 of the auxiliary gear shift lever 25 is the sleeve member 32 which has an integral outwardly projecting member 32a at the lower end thereof, which member is adapted to cooperate with a sector in a manner and for a purpose hereinafter more clearly described, a thrust rod bracket 33 rigidly secured to the shaft portion 27 and provided with a suitable aperture for receiving the cross bolt or bearing bolt 34. The sleeve 32 is provided, at its lower end, with an axial slot surrounding the bracket 33, and, at its upper end, with an aperture 35 adapted to receive the lower end of the locking rod 36, which lower end is provided with a cotter pin 37 adapted to retain the lower end in the aperture 35 in the sleeve 32.

The shaft portion 27 is provided with an axial slot 27a at its upper end to provide bearing means for slidably receiving the inwardly bent lower portion of the locking rod 36. The locking rod 36 has its upper end pivotally secured to a pin 38 extending transversely of the locking lever 39 which is provided at its outer end with a suitable handle and which has its inner end pivoted at 40 to the upper end of the extension 29 of the auxiliary gear shift lever 25. The locking lever 39 is provided with a stop member 39a which is adapted to engage the locking rod 36 to suitably locate the locking lever 39, the locking rod 36 and the sleeve 32 and prevent further downward movement of the sleeve 32 beyond the lowermost position defined by this means. The locking lever 39 may be manually engaged and swung upwardly to draw the locking rod 36 upwardly and thus move the sleeve 32 upwardly for a purpose which will hereinafter more clearly appear.

The link 41, which is preferably flat or flattened at each end, has its lower end pivotally supported by the cross bolt 22 extending through the rear rod end 19 and is provided at its upper end with a suitable bearing aperture for receiving the cross bolt or bearing bolt 42. The link 41 and shaft portion 27 of the auxiliary gear shift lever 25 are connected and normally retained in parallelism by the thrust rod which is generally designated 43. The thrust rod 43 comprises a central tubular member 44 having the forward rod end 45 secured to the forward end portion thereof and the rear thrust rod end 46 secured to the rear end thereof. The forward thrust rod end 45 comprises a bifurcated member inserted within the slotted forward end of the tubular member 44 and provided with an aperture aligned with a suitable aperture in the tubular member 44 and with the aperture in the bracket 33 for receiving the cross bolt 34 which extends through the aligned apertures to pivotally secure the left end of the thrust rod 43 to the extension 33.

The rear rod end 46 has a reduced end portion 47 which extends into, and is secured to, the rear end portion of the tubular member 44 in the same manner in which the reduced end portion 20 of the rear bearing rod end 19 cooperates with the tubular member 14 (Figure 6). The rear thrust rod end 46 is provided with a transverse slot 48 which, similarly to the slots 17 and 21, diverges in opposite directions, and the rod end 46 is also provided with a suitable cross aperture adapted to receive the cross bolt or bearing bolt 42 which also extends through an aperture in the link 41.

Attached to the rear end of the thrust rod 43 is the thrust bracket 49 which is provided with a pair of spaced eyes which closely engage the rod end 46 and which are disposed at opposite ends of the slot 48. This thrust bracket 49 is retained on the rear thrust rod end 46 by means of a thrust washer 50 which is disposed about the screw-threaded reduced rear end portion 51 of the rod end 46, which threaded end portion 51 carries a lock nut 52, which engages the lock washer 50. The forwardmost eye of the thrust bracket is provided with a set screw 54, which is screw-threaded therethrough and which extends into a suitable aperture provided in the rod end 46, as shown in Figure 1. The thrust bracket 49 has a plate portion which extends substantially horizontally and inwardly with respect to the engine 1 and which terminates in a downwardly disposed substantially vertical flange 55 which is provided with a screw-threaded aperture 56 for receiving the screw-threaded portion 58 of the socket head 57, which screw-threaded portion 58 is secured in adjustment in the aperture 56 by lock nuts 59. The body portion of the socket head 57 is provided with a suitable socket 60, in which is pivotally supported for universal movement the ball end portion 61 of the fitting 62 which is screw-threaded at its lower end to the conventional gear shift lever 2 which has its length predeterminedly reduced and provided with a screw-threaded portion engaging the screw-threaded portion of the fitting 62. The effective distance between the ball member 61 and the thrust rod 43 may be closely adjusted by means of the adjustment provided by the screw-threaded portion 58 of the socket head 57, the lock nuts 59 and the screw-threaded aperture 56 in the flange 55 of the thrust bracket 49.

The thrust rod 43 is preferably provided with a bent intermediate portion, as shown in Figure 1, which may engage the side of the engine block or any other suitable guide means for limiting movement of the thrust rod 43 in one direction and which, in addition to this function and the function of providing clearance for certain engine accessories, imparts resiliency to the thrust rod 43.

A sector member 63 (Figures 1 and 2) is provided for cooperation with the projection 32a to prevent accidental engagement of the "reverse" gear of the transmission. This sector member is adapted to be rigidly secured to the power plant unit and the upper edge surface thereof, which is designated 64, is provided with a stop projection 65 having a vertical rear edge and an inclined forward edge. When the sleeve 32 is in lowermost position (which is defined by the cooperation of the axial slot in the lower end thereof with the bracket 33), the lower end of the sleeve 32 and the lower end of projection 32a are below the top surface 64 of the sector. Therefore, the projection 32a engages the inner surface of the sector and the auxiliary gear shift lever is prevented from being swung beyond the neutral position in one direction, although it may be freely swung in the opposite direction to "second" and "high" gear position.

If the sleeve 32 is raised slightly by actuation of the means 36, 39, etc., the lower surface of the projection 32a will clear the sector a slight distance and the auxiliary gear shift lever may be swung into "low" gear position. Upon release of means 36, 39, the projection 32a will ride upon the top surface 64 of the sector 63 rearwardly of the stop projection 65. In order to place the auxiliary gear shift lever in the "reverse" position, it is necessary that the sleeve 32 and projection 32a be raised a substantial distance through actuation of the mechanism 36, 39, etc., in order that the projection 32a may be placed in position on the inclined forward surface of the stop projection 65 where it will be retained against displacement until the means 36, 39, etc., is again actuated to raise the sleeve 32 and its integral projection 32a.

By means of the adjustment provided by the screw-threaded portion of the socket head 57, the position of the auxiliary gear shift lever and the projection 32a carried thereby may be adjusted with ease to secure the desired relative positioning of the cooperating projection 32a, sector 63 and stop projection 65 thereof.

One of the features of this invention is the mounting of the articulated supplementary gear shift on the side of the motor and the gear shift case closely adjacent thereto with the gear shift lever at the forward end of the engine so that the operator may sit closely adjacent to the gear shift mechanism at the forward end of the engine. In bus work, this permits the operator to sit at the front of the engine or along side the front so as to improve his vision instead of sitting behind it. The articulated remote control gear shift mechanism of this invention and its arrangement in this position permits this.

It is a further object to have the main gear shift lever very short and the articulated supplementary gear shift mechanism of relatively the same height so that all of it can be readily concealed and so that the movement thereof will take the least space along the side of and to the rear of the engine. The main gear shift lever being at the front end of the engine closely adjacent the front of the vehicle does not interfere with the seating of passengers or carrying of a load.

It will be understood that the above-described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In remote control means for a gear shift lever, an auxiliary gear shift lever, and a multiplying leverage linkage including thrust and pivot rod members with interconnecting link means between said auxiliary gear shift lever and said gear shift lever for transmitting movement of said auxiliary gear shift lever to said gear shift lever, said thrust rod comprising adjustable means interconnecting said thrust rod and said gear shift lever.

2. In remote control means for a gear shift lever, an auxiliary gear shift lever, and a multiplying leverage linkage comprising a thrust and pivot rod linked together in the form of a parallelogram between said auxiliary gear shift lever and said gear shift lever for transmitting movement of said auxiliary gear shift lever into similar movement of said gear shift lever, said thrust rod being connected to said gear shift lever by adjustable means whereby the effective distance between said thrust rod and gear shift lever may be varied.

3. In combination, a conventional transmission gear shift lever, an auxiliary gear shift lever laterally and longitudinally spaced therefrom, a force parallelogram multiplying linkage comprising thrust and interconnected rotatable pivot rod means therebetween for transmitting movement of said auxiliary gear shift lever into similar movement of said conventional gear shift lever, and means operatively connected to said auxiliary lever below said thrust rod for locking said conventional gear shift lever against movement to set the reverse gear in engagement until desired.

4. In combination, a conventional transmission gear shift lever, an auxiliary gear shift lever laterally and longitudinally spaced therefrom, parallel linkage arranged therebetween comprising a thrust and pivot rod member for transmitting movement of said auxiliary gear shift lever into similar movement of said conventional gear shift lever, means comprising a cam surface sector having a stop means positioned thereon for normally locking said auxiliary gear shift out of "reverse" gear position, and manually operable lever means associated with said auxiliary gear shift lever for so adjusting said last-named means as to unlock said auxiliary gear shift lever for placement in "reverse" gear position.

5. In combination, a conventional transmission gear shift lever, an auxiliary gear shift lever laterally and longitudinally spaced therefrom, a multiple leverage linkage comprising thrust and pivot rod members therebetween for transmitting movement of said auxiliary gear shift lever into similar movement of said conventional gear shift lever, said thrust rod comprising a curved intermediate portion for limiting movement of said thrust rod in one direction, and means comprising a lever associated with said auxiliary gear shift lever for normally locking said auxiliary gear shift lever and said conventional gear shift lever out of "reverse" gear position, said last-named means being manually operable to unlock said gear shift levers for placement in "reverse" gear position, said locking mechanism comprising a cam and stop means for normally limiting the movement of said auxiliary gear shift lever.

6. In combination, a conventional transmission gear shift lever, an auxiliary gear shift lever laterally spaced therefrom, a linkage connecting said gear shift levers and including a pivot rod providing support for said auxiliary gear shift lever, a thrust rod above and parallel to said pivot rod and pivotally connected to said auxiliary gear shift lever, and adjustable means on said thrust rod providing universal connection between said thrust rod and said conventional gear shift lever.

7. In combination, a conventional transmission gear shift lever, an auxiliary gear shift lever laterally spaced therefrom, a linkage connecting said gear shift levers and including a pivot rod providing support for said auxiliary gear shift lever, a thrust rod parallel to said pivot rod and pivotally connected to said auxiliary gear shift lever, and adjustable means on said thrust rod providing ball-and-socket universal connection between said thrust rod and said conventional gear shift lever.

8. In remote control means for a conventional gear shift lever, a longitudinal pivot rod, an auxiliary gear shift lever pivoted thereon, a thrust rod pivotally secured at one end to said auxiliary gear shift lever, a link pivoted at one end to said pivot rod and at the other end to said thrust rod, and means providing a universal connection between said thrust rod and said conventional gear shift lever.

9. In remote control means for a conventional gear shift lever, a pivot rod supported for pivotal movement about a longitudinal axis, an auxiliary gear shift lever pivoted about a transverse axis on said pivot rod, a thrust rod pivotally secured at one end to said auxiliary gear shift lever, a link pivoted at one end about a transverse axis on said pivot rod and at the other end about a transverse axis on said thrust rod, and means providing a universal connection between said thrust rod and said conventional gear shift lever.

10. In remote control means for a conventional gear shift lever, a pivot rod supported for pivotal movement about a longitudinal axis, an auxiliary gear shift lever pivoted about a transverse axis on said pivot rod, a slidable sleeve on said auxiliary gear shift lever having a stop projection thereon normally preventing "reverse" gear engagement, a thrust rod pivotally secured at one end to said auxiliary gear shift lever, a link pivoted at one end about a transverse axis on said pivot rod and at the other end about a transverse axis on said thrust rod, means providing a universal connection between said thrust rod and said conventional gear shift lever, and means on said auxiliary gear shift lever manually operable to slidably position said sleeve to unlock said conventional gear shift lever for "reverse" gear engagement.

11. In remote control means for a conventional gear shift lever, a support rod pivoted about a longitudinal axis, a link pivoted about a transverse axis at one end of said support rod, an auxiliary gear shift lever pivoted at the other end of said support rod about an axis parallel to said first axis, a thrust rod pivoted at one end to said link and at the other end to said auxiliary gear shift lever, means universally connecting said thrust rod to said conventional gear shift lever, a stationary sector, and means on said auxiliary gear shift lever normally operative to latch said lever out of "reverse" gear position, said last-named means being manually operable for unlatching said auxiliary gear shift lever for positioning in "reverse" gear position.

12. In remote control means for a conventional gear shift lever, a support rod pivoted about a longitudinal axis, a link pivoted about a transverse axis at one end of said support rod, an auxiliary gear shift lever pivoted at the other end of said support rod about an axis parallel to said first axis, a thrust rod pivoted at one end to said link and at the other end to said auxiliary gear shift lever, and means universally connecting said thrust rod to said conventional gear shift lever, said last-named means including a member capable of adjustment to vary the angle between said conventional gear shift lever and said auxiliary gear shift lever.

13. In remote control means for a conventional gear shift lever, a stationary sector, a support rod adapted to be pivotally supported on a vehicle engine for pivotal movement about a longitudinal axis, a link pivoted about a transverse axis at one end of said support rod, an auxiliary gear shift lever pivoted at the opposite end of said support rod about an axis parallel to said first axis, a thrust rod pivoted at one end to said link, means on said auxiliary gear shift lever to pivotally support the opposite end of said thrust rod, means on said auxiliary gear shift lever cooperating with said sector to restrain said lever against accidental engagement in "reverse" gear position, and means to change the angle between said conventional and auxiliary gear shift levers for adjustably positioning said auxiliary gear shift lever with respect to said stationary sector.

14. In remote control means for a conventional gear shift lever, a support rod adapted to be pivoted about a longitudinal axis adjacent a vehicle engine, a link pivoted about a transverse axis at one end of said support rod, an auxiliary gear shift lever pivoted at the opposite end of said support rod about an axis parallel to said first axis, a thrust rod having pivotal connection at one end to said auxiliary gear shift lever and at the other end to said link, means providing universal connection between said thrust rod and the conventional gear shift lever associated with the motor of a vehicle, and a bent portion on said thrust rod adapted to cooperate with the vehicle motor to limit swinging movement of said mechanism in one direction about the longitudinal axis of said support rod.

15. In remote control means for a conventional gear shift lever, an auxiliary gear shift lever spaced longitudinally and laterally from said conventional gear shift lever for universal swinging movement, and a linkage between said auxiliary gear shift lever and said conventional gear shift lever, said linkage including a thrust rod having a hollow bent portion adapted to provide resiliency in said linkage.

16. In remote control means for a conventional gear shift lever, an auxiliary gear shift lever spaced longitudinally and laterally from said conventional gear shift lever for universal swinging movement, and a linkage between said auxiliary gear shift lever and said conventional gear shift lever, said linkage including a thrust rod having a hollow bent portion adapted to provide resiliency in said linkage, said bent portion being adapted to cooperate with a stationary surface to limit swinging movement of said auxiliary gear shift lever in one direction.

17. In remote control means for a conventional gear shift lever, a stationary sector with a stop projection thereon, a support rod pivoted about a longitudinal axis, a link pivoted about a transverse axis at one end of said support rod, an auxiliary gear shift lever pivoted at the other end of said support rod about an axis transverse to said longitudinal axis, a sleeve slidable on said auxiliary gear shift lever and having thereon a stop member, a thrust rod pivoted at one end to said link and at the other end to said auxiliary gear shift lever, means universally connecting said thrust rod to said conventional gear shift lever, and manually operable means to position said sleeve on said auxiliary gear shift lever, to place said stop member out of the path of the stop projection on said sector for placing said auxiliary gear shift lever in "reverse" gear position.

18. In remote control means for a conventional gear shift lever, a stationary guide sector, a support rod pivoted about a longitudinal axis, a link pivoted about a transverse axis at one end of said support rod, an auxiliary gear shift lever pivoted at the other end of said support rod about an axis transverse to said longitudinal axis, a sleeve slidable on said auxiliary gear shift lever, a stop projection adapted normally to engage said sector to retain said auxiliary gear shift lever out of "reverse" gear position, a thrust rod pivoted at one end to said link and at the other end to said auxiliary gear shift lever, means universally connecting said thrust rod to said conventional gear shift lever, and manually operable means on said auxiliary gear shift lever for slidably adjusting said sleeve to place the stop projection on said auxiliary gear shift lever out of engagement with said sector in order that the auxiliary gear shift lever may be placed in "reverse" gear position.

19. In combination, an engine and gear box, a relatively short gear shifting lever projecting from said box behind said engine, a supplementary gear shifting mechanism comprising a thrust rod attached to said gear shifting lever, said thrust rod being attached thereto by means comprising an adjustable link and universal connection means, and adjustable means for mounting said mechanism in parallel relationship to said box closely adjacent said engine and laterally and longitudinally spaced therefrom.

20. In combination, an engine and gear box, a relatively short gear shifting lever projecting from said box behind said engine, a supplementary gear shifting mechanism comprising a parallel arranged thrust rod and pivot member attached to said gear shifting lever, and adjustable means for mounting said mechanism in parallel relationship to said box closely adjacent said engine and attached thereto.

21. In combination, an engine and gear box, a relatively short gear shifting lever projecting from said box behind said engine, a supplementary gear shifting mechanism attached to said gear shifting lever, means for mounting said mechanism in closely adjacent parallel relationship to said box and said engine on said engine, and a relatively long main actuating lever located adjacent the front of said engine and extending above it for actuating said supplementary gears shifting mechanism, said supplementary mechanism comprising a pivot member having a universal connection between said gear shifting levers, said connecting means comprising an adjustable link.

22. In combination, an engine, a gear box, a gear shift lever, means for actuating said gear shift lever from the front of the engine extending to and connected with said gear shift lever at the rear of the engine and arranged to be supported by said engine in closely parallel arrangement with respect thereto, and adjustable lever means for actuating said gear shift lever comprising a thrust rod and pivot member connected to an auxiliary gear shifting means through a universal connection, said universal connection being adjustably connected to said thrust rod.

RALPH D. NEIDERHISER.